United States Patent
Suzuki et al.

(10) Patent No.: US 11,549,808 B2
(45) Date of Patent: Jan. 10, 2023

(54) ROAD SURFACE CONDITION DETERMINING DEVICE, AND TIRE SYSTEM PROVIDED WITH SAME

(71) Applicant: DENSO CORPORATION, Kariya (JP)

(72) Inventors: Yoichiro Suzuki, Nisshin (JP); Takatoshi Sekizawa, Kariya (JP); Nobuya Watabe, Kariya (JP)

(73) Assignee: DENSO CORPORATION, Kariya (JP)

( * ) Notice: Subject to any disclaimer, the term of this patent is extended or adjusted under 35 U.S.C. 154(b) by 394 days.

(21) Appl. No.: 16/814,789

(22) Filed: Mar. 10, 2020

(65) Prior Publication Data
US 2020/0208969 A1    Jul. 2, 2020

Related U.S. Application Data (63) Continuation of application No. PCT/JP2018/037814, filed on Oct. 10, 2018.

(30) Foreign Application Priority Data

Oct. 11, 2017    (JP) .............................. JP2017-197989

(51) Int. Cl.
*G01B 17/08*    (2006.01)
*B60C 23/04*    (2006.01)

(52) U.S. Cl.
CPC .......... *G01B 17/08* (2013.01); *B60C 23/0408* (2013.01); *B60C 23/0488* (2013.01)

(58) Field of Classification Search
CPC . G01B 17/08; B60C 23/0408; B60C 23/0488; B60C 23/064; B60C 19/00; B60T 2210/14; B60T 8/1725; B60W 40/06; G01W 1/00
See application file for complete search history.

(56) References Cited

U.S. PATENT DOCUMENTS

| 10,377,385 B2 * | 8/2019 | Hanatsuka | ............ B60W 40/06 |
| 10,525,777 B2 * | 1/2020 | Goto | ..................... B60C 23/064 |
| 10,668,927 B2 * | 6/2020 | Boisset | ................. B60W 40/06 |
| 11,142,210 B2 * | 10/2021 | Kanbayashi | ........ B60W 40/068 |

(Continued)

FOREIGN PATENT DOCUMENTS

| JP | 2005170222 A | 6/2005 |
| JP | 2014035279 A | 2/2014 |

(Continued)

*Primary Examiner* — Eric Blount
(74) *Attorney, Agent, or Firm* — Harness, Dickey & Pierce, P.L.C.

(57) ABSTRACT

In a road surface condition determining device, when determining a road surface condition, a vibration detection unit, a waveform processing unit and a data transmission unit for implementing a sensing function and a data transmission function are not set continuously to an active state for all tire side device, but at least only one tire side device is set to an active state. Remaining one or more is set to a sleep state. A reduction in power consumption of the tire side devices set to the sleep state can thus be achieved. Further, with regard to the at least one tire side device, since the sensing function and the data transmission function remain in the active state, the road surface condition can be reliably determined based on the road surface data of the tire side device.

7 Claims, 7 Drawing Sheets

(56) References Cited

U.S. PATENT DOCUMENTS

| | | | |
|---|---|---|---|
| 2009/0071249 A1* | 3/2009 | Kitazaki | G01P 15/123 |
| | | | 73/514.33 |
| 2009/0105921 A1* | 4/2009 | Hanatsuka | B60G 17/0165 |
| | | | 701/80 |
| 2009/0210075 A1 | 8/2009 | Moriwaki | |
| 2011/0128910 A1 | 6/2011 | Moriwaki | |
| 2015/0210286 A1 | 7/2015 | Hanatsuka et al. | |
| 2016/0368501 A1 | 12/2016 | Suzuki et al. | |
| 2017/0311222 A1 | 10/2017 | Yamashita et al. | |

FOREIGN PATENT DOCUMENTS

| | | |
|---|---|---|
| JP | 2015174637 A | 10/2015 |
| JP | 2016076085 A | 5/2016 |
| JP | 2017163357 A | 9/2017 |
| WO | WO-2006090480 A1 | 8/2006 |
| WO | WO-2016113884 A1 | 7/2016 |

* cited by examiner

ROAD SURFACE CONDITION DETERMINING DEVICE, AND TIRE SYSTEM PROVIDED WITH SAME

CROSS REFERENCE TO RELATED APPLICATION

The present application is a continuation application of International Patent Application No. PCT/JP2018/037814 filed on Oct. 10, 2018, which designated the United States and claims the benefit of priority from Japanese Patent Application No 2017-197989 filed on Oct. 11, 2017. The entire disclosures of all of the above applications are incorporated herein by reference.

FIELD

The present disclosure relates to a road surface condition determining device which detects vibration received by a tire in a tire side device, produces road surface data representing a road surface condition based on vibration data, transmits the road surface data to a vehicle body side system, and determines the road surface condition based on the road surface data.

BACKGROUND

A conventional road surface condition determining device includes an acceleration sensor attached to a rear surface of a tire tread to detect a vibration applied to the tire, and estimates a road surface condition based on a detection result of the vibration. This road surface condition determining device estimates the road surface condition by producing data representing a road surface condition based on a vibration waveform of the tire detected by the acceleration sensor and transmitting the data of each wheel to a vehicle body side receiver and the like.

Since the tire side device such as the acceleration sensor is provided within the tire, a battery for the tire side device cannot be replaced readily. It is thus necessary to perform sensing and data communication with limited power of the battery.

SUMMARY

A road surface condition determining device according to the present disclosure comprises a tire side device and a road surface condition determination unit. The tire side device is attached to each of a plurality of tires of a vehicle and includes a vibration detection unit for outputting a detection signal corresponding to a magnitude of vibration of the tire, a waveform processing unit for generating road surface data indicating a road surface condition appearing in a waveform of the detection signal, and a data transmission unit for transmitting the road surface data. The road surface condition determination unit includes a data reception unit for receiving the road surface data transmitted from the data transmission unit, and determines a road surface condition of a travel road surface of the vehicle based on the road surface data.

DETAILED DESCRIPTION OF THE EMBODIMENT

Embodiments of the present disclosure will be described below with reference to the drawings. In each embodiment described below, same or equivalent parts are designated with the same reference numerals to thereby simplify the description.

First Embodiment

Figure 1:
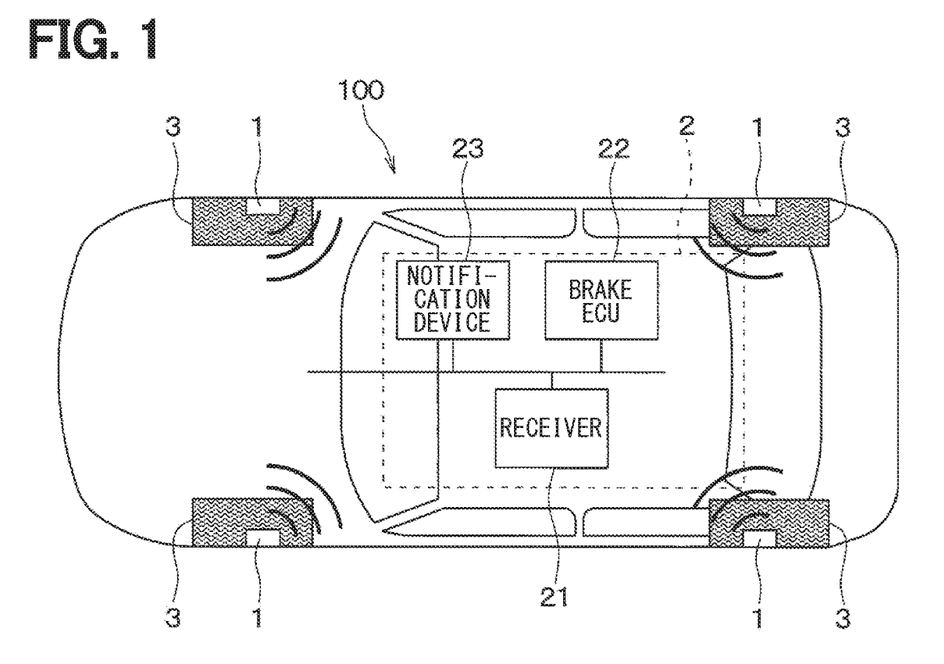
FIG. 1 is a schematic diagram illustrating a block configuration of a tire device to which a tire side device according to a first embodiment is applied in a state where the tire device is mounted in a vehicle.
Figure 2:
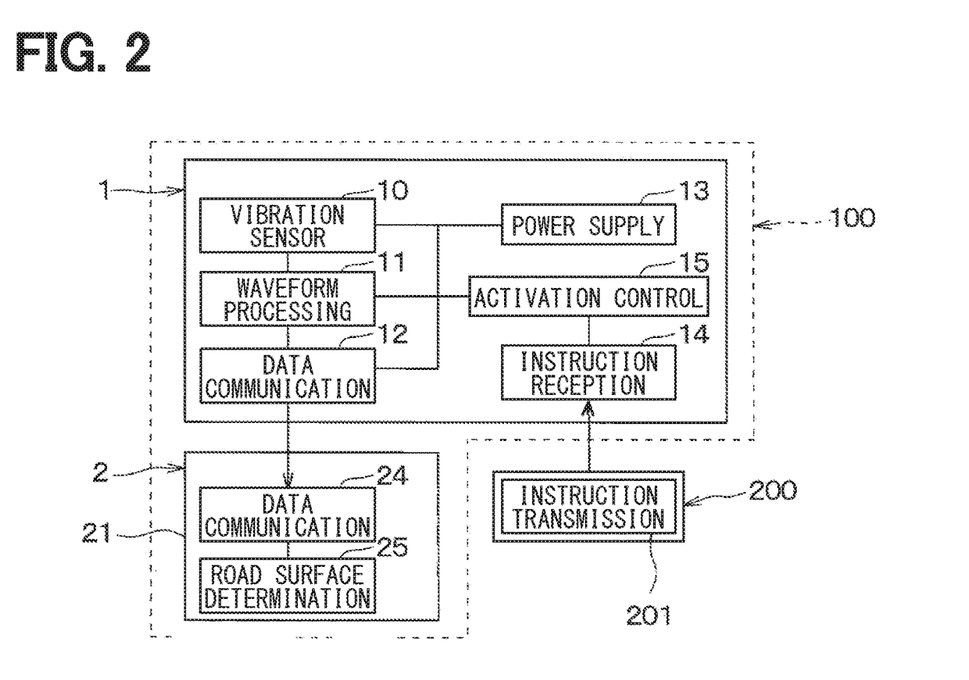
FIG. 2 is a block diagram illustrating details of the tire side device, a body side system and a tool.

A road surface condition determining device according to the present embodiment will be described with reference to FIG. 1 to FIG. 8. As shown in FIG. 1 and FIG. 2, a tire device 100 according to the present embodiment is configured to determine a road surface condition during traveling of a vehicle based on a vibration applied to a ground contact surface of a tire provided in each of road wheels of the vehicle, and also perform warning, vehicle movement control and the like based on a determined road surface condition.

The tire device 100 is configured to have tire side devices 1 provided on tire wheel sides and a vehicle body side system 2, which includes various parts provided on the vehicle body side. As the body side system 2, a receiver 21, an electronic control unit for brake control (hereinafter referred to as a brake ECU) 22, a notification device 23 and the like are provided. A part of the tire device 100, which performs a road surface condition determination operates as a road surface condition determining device. In the present embodiment, the tire side devices 1 and the receiver 21 of the body side system 2 operate as the road surface condition determining device.

The tire device 100 according to the present embodiment is configured to transmit data (hereinafter, referred to as road surface data) corresponding to the road surface condition of a road on which the tire 3 is moving from the tire side device 1, and receives the road surface data by the receiver 21 to determine the road surface condition. In addition, the tire device 100 is configured to transmit the determination result of the road surface condition determined by the receiver 21 to the notification device 23 and cause the notification device 23 to notify the determination result of the road surface condition. It is thus made possible to notify a driver of the road surface condition, for example, that the road surface is dry, wet or frozen. It is also made possible to warn the driver if the road surface is slippy. In addition, the tire device 100 is configured to perform vehicle motion control for avoiding danger by transmitting the road surface condition to the brake ECU 22 and the like that perform vehicle motion control. For example, when the road surface is frozen, the braking force generated with respect to the brake operation amount is weakened as compared with the case of a dry road, so that vehicle motion control corresponding to a low road surface friction coefficient μ is performed. Specifically, the tire side device 1 and the receiver 21 are configured as follows.

Figure 3:
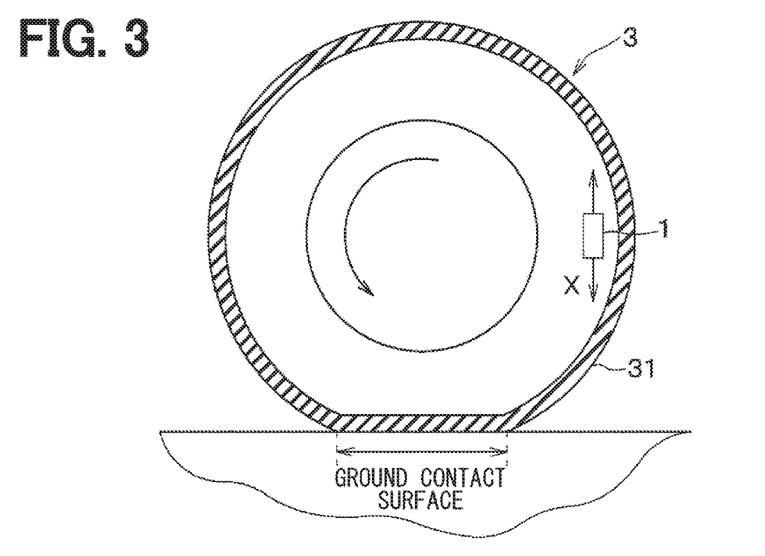
FIG. 3 is a schematic view showing in cross section a tire to which the tire side device is attached.

The tire side device 1 is configured to include, as shown in FIG. 2, a vibration sensor unit 10, a waveform processing unit 11, a data communication unit 12, a power supply unit 13, an instruction reception unit 14 and an activation control unit 15. The tire side device 1 is attached to an inside surface side of a tread of the tire 3 as shown in FIG. 3.

The vibration sensor unit 10 is configured as a vibration detection unit for detecting vibrations applied to the tire 3. For example, the vibration sensor unit 10 is configured by an acceleration sensor. In case that the vibration sensor unit 10 is the acceleration sensor, the vibration sensor unit 10 outputs a detection signal of acceleration as a detection signal, which corresponds to the vibration in a direction tangential to a circular trajectory drawn up by the tire side device 1 at the time of rotation of the tire 3, that is, a tire tangential direction indicated by an arrow X in FIG. 3. For example, the vibration sensor unit 10 performs acceleration detection at a predetermined sampling cycle set at a cycle shorter than one rotation of the tire 3, and outputs a detection result as the detection signal.

The waveform processing unit 11 is configured by a microcomputer having a CPU, a ROM, a RAM, an I/O, etc., to perform signal processing of the detection signal according to a program stored in the ROM or the like, and produces a road surface condition appearing in the detection signal.

Specifically, the waveform processing unit 11 performs waveform processing of a vibration waveform indicated by the detection signal by using the detection signal output from the vibration sensor unit 10 as a detection signal representing vibration data in the tangential direction of the tire 3. In the present embodiment, the waveform processing unit 11 extracts a characteristic value of acceleration of the tire 3 (hereinafter referred to as tire G) by performing signal processing on the detection signal of the acceleration of the tire 3. Further, the waveform processing unit 11 is configured to transmit data including the extracted characteristic value to the data communication unit 12 as road surface data. Details of the characteristic value will be described later.

Further, the waveform processing unit 11 is configured to control data transmission from the data communication unit 12 and transmit the road surface data to the data communication unit 12 at a timing at which data transmission is desired. Thus, the waveform processing unit 11 performs data communication with the data communication unit 12. For example, the waveform processing unit 11 extracts the characteristic value of the tire G each time the tire 3 makes one rotation, and transmits the road surface data to the data communication unit 12 once or a plurality of times each time the tire 3 makes one or a plurality of rotations. For example, the waveform processing unit 11 transmits, to the data communication unit 12, the road surface data including the characteristic value of the tire G extracted during one rotation of the tire 3 when transmitting the road surface data to the data communication unit 12.

The data communication unit 12 is a part of a data transmission unit. For example, when the road surface data is transmitted from the waveform processing unit 11, the data communication unit 12 transmits the road surface data at that timing. The timing of data transmission from the data communication unit 12 is controlled by the waveform processing unit 11. Each time the road surface data is transmitted from the waveform processing unit 11 every time the tire 3 makes one or more rotations, the data communication unit 12 performs data transmission.

The power supply unit 13 is provided as a power supply for the tire side device 1, and supplies electric power to each unit included in the tire side device 1 so that each unit in the tire side device 1 can be operated. The power supply unit 13 is configured by a battery such as a button battery, for example. Since the tire side device 1 is provided inside the tire 3, the battery cannot be easily replaced. It is therefore necessary to reduce power consumption as much as possible.

The instruction reception unit 14 is configured to perform a function of transmitting a signal indicating a content of an instruction signal to the activation control unit 15 upon receiving an instruction signal for instructing an activation or a sleep transmitted from the tool 200, which is provided outside the vehicle. Specifically, the instruction signal includes an activation (startup) instruction signal for instructing to enter an active state and a sleep instruction signal for instructing to enter a sleep state. The instruction reception unit 14 is configured to transmit, to the activation control unit 15, a signal indicating which of the activation instruction signal and the sleep instruction signal has been received, at the time of receiving the instruction signal. As the instruction signal, for example, an RF (radio frequency) signal is used, and hence the instruction reception unit 14 is configured by a receiver that can receive an RF signal.

In addition, each tire side device 1 is assigned unique identification information (hereinafter, referred to as ID information) which is different from tire to tire. The instruction signal is accompanied by the ID information in addition to the activation instruction signal or the sleep instruction signal. Each tire side device 1 is configured to check whether the instruction signal is directed to itself based on the ID information attached to the instruction signal. For this reason, the instruction reception unit 14 is configured to transmit, at the time of receiving the instruction signal with its own ID information, a signal indicating the content to the activation control unit 15.

The activation control unit 15 is configured to activate a sensing function and a data transmission function and control the sleep operation in the tire side device 1 according to the content of the instruction signal transmitted from the instruction reception unit 14. Specifically, the activation control unit 15 performs the activation control and the sleep control of the vibration sensor unit 10, the waveform processing unit 11 and the data communication unit 12. Accordingly, when the vibration sensor unit 10, the waveform processing unit 11 and the data communication unit 12 are in the sleep state, no power of the power supply unit 13 is consumed in these units, so that power consumption in the tire side device 1 can be reduced.

It is noted that it is only a part of the tire side device 1, which performs the sensing function and the data transmission function, that sleeps, and other part of the tire side device 1 such as the instruction reception unit 14 and the activation control unit 15 does not sleep and consumes power. However, since the part that realizes the sensing function and the data transmission function consumes a large amount of power, putting such functional parts into the sleep state is effective to reduce power consumption.

On the other hand, the receiver 21, the brake ECU 22 and the notification device 23 forming the body side system 2 are configured to become operable when a start switch such as an ignition switch (not shown) of the vehicle is turned on.

The receiver 21 is configured to include a data communication unit 24 and a road surface condition determination unit 25, as shown in FIG. 2.

The data communication unit 24 is a part of data reception unit, and provided to receive the road surface data including the characteristic value and transmitted from the data communication unit 12 of the tire side device 1 and transmit the road surface data to the road surface condition determination unit 25.

The road surface condition determination unit 25 is configured by a well-known microcomputer including a CPU, a ROM, a RAM, an I/O, and performs various processing according to a program stored in the ROM or the like to determine the road surface condition. Specifically, the road surface condition determination unit 25 is configured to store a support vector, and determine the road surface condition by comparing the road surface data transmitted from the waveform processing unit 11 with the support vector.

The support vector is set and stored for each type of road surface. The support vector is a characteristic value serving as a model, and is acquired, for example, by learning using a support vector machine. The support vector is acquired by experimentally driving a vehicle equipped with the tire side device 1 on each type of road surface. During the experimental driving, the characteristic value extracted by the waveform processing unit 11 is learned for a predetermined number of tire rotations, and a predetermined number of typical characteristic quantities are extracted from the learned data. For example, the characteristic value is learned for one million rotations for each type of road surface, and a typical characteristic value for 100 rotations is extracted from the learned values as the support vector.

The road surface condition determination unit 25 is configured to determine the road surface condition by comparing the characteristic value transmitted from the tire side device 1 received by the data communication unit 24 with the stored support vector for each type of road surface. For example, the road surface condition determination unit 21 compares the characteristic value included in the road surface data received at present time with the support vectors stored for each type of the road surface condition, and determines the road surface condition corresponding to the support vector which is closest to the present characteristic value to be a presently traveling road surface.

After determining the road surface condition, the road surface condition determination unit 25 transmits the road surface condition to the notification device 23, which notifies a driver of the road surface condition if necessary. Thus, the driver is enabled to try to drive the vehicle in a manner matching the road surface condition and avoid danger to the vehicle. For example, the determined road surface condition may be displayed always by the notification device 23 or the road surface condition may be displayed to warn the driver only when the vehicle need be driven more carefully than usual, for example, when the determined road surface condition corresponds to a wet road or a frozen road. The road condition is transmitted from the receiver 21 to an ECU such as the brake ECU 22, which performs vehicle motion control, so that the vehicle motion control is performed based on the transmitted road surface condition.

The brake ECU 23 is configured as a brake control device that performs various brake controls. Specifically, the brake ECU 22 controls a braking force by increasing or decreasing a wheel cylinder pressure by driving an actuator for controlling a brake fluid pressure. In addition, the brake ECU 23 independently controls the braking force of each wheel. When the road condition is transmitted from the receiver 21, the brake ECU 22 controls the braking force as the vehicle motion control based on the transmitted road surface condition. For example, when the transmitted road surface condition indicates a frozen road, the brake ECU 22 weakens the braking force generated in response to the amount of brake operation by the driver, as compared with a dry road surface. Thereby, wheel slip can be suppressed.

The notification device 23 is configured with a meter display device, for example, and used to notify the driver of the road surface condition. In case that the notification device 23 is configured with the meter display device, it is located at a position which the driver is capable of recognition during driving of the vehicle, for example, within an instrument panel in the vehicle. When the road surface condition is transmitted from the receiver 21, the meter display device visually notifies the driver of the road surface condition by performing display in such a manner that the state of the road surface can be grasped.

The notification device 23 may alternatively be configured as a buzzer or a voice guidance device. In such a case, the notification device 23 notifies the driver of the road surface condition audibly by buzzer sound or voice guidance. Although the meter display device is exemplified as the notification device 23 providing visual notification, the notification device 23 may be configured as a display device that displays information such as a head-up display.

The tire device 100 is configured as described above in the present embodiment. Each unit forming the body side system 2 is connected through an in-vehicle LAN (Local Area Network) like CAN (Controller Area Network) communication.

Thus each unit is capable of communicating information mutually through the in-vehicle LAN.

Further, in the present embodiment, in addition to the tire device 100, the tool 200 is provided outside the vehicle, so that a tire system is capable of activating each tire side device 1 and switching operation modes.

The tool 200 is used in a vehicle maintenance shop such as a car dealer. The tool 200 is configured to include an instruction transmission unit 201 that transmits the instruction signal to each tire side device 1. Specifically, the tool 200 transmits an RF signal as the instruction signal from the instruction transmission unit 201 to instruct each tire side device 1 to activate or sleep.

The tire device 100 and the tool 200 are configured as described above in the present embodiment.

Next, details of the characteristic value extracted by the waveform processing unit 11 will be described below.

The characteristic value referred to herein is a value indicative of a value indicating a feature of vibration applied to the tire 3 and acquired by the vibration sensor unit 10.

Figure 4:
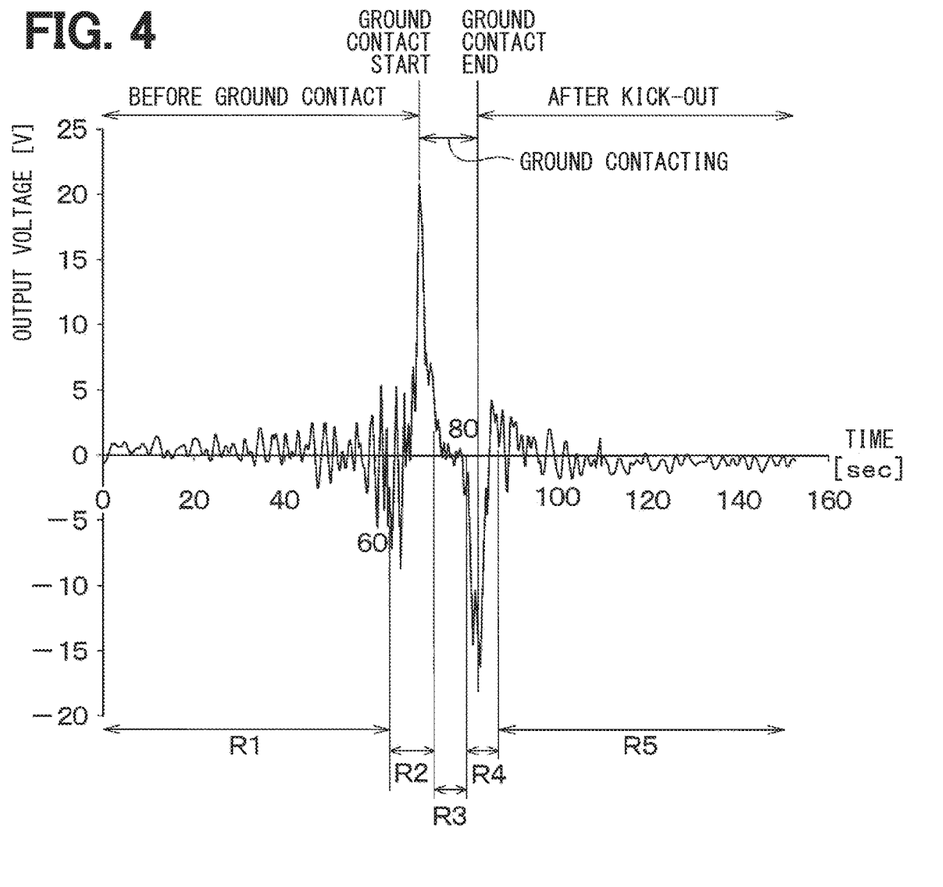
FIG. 4 is a chart illustrating an output voltage waveform of an acceleration signal acquisition unit during tire rotation

For example, an output voltage waveform of the detection signal of the vibration sensor unit 10 outputted at the time of tire rotation changes as shown in FIG. 4. As understood from this figure, the output voltage of the vibration sensor unit 10 has a local maximum value at a contact start time when a portion of a tread 31 of the tire 3 at which the vibration sensor unit 10 is attached starts to contact the ground during the rotation of the tire 3. Hereinafter, a peak value at the start time of contacting the ground where the output voltage of the vibration sensor unit 10 has the local maximum value is referred to as a first peak value. Further, as shown in FIG. 4, the output voltage of the vibration sensor unit 10 has a local minimum value at a contact end time when the portion of the tread 31 of the tire 3 corresponding to the position of the vibration sensor unit 10 is changed from a state contacting the ground to a state not contacting the ground during the rotation of the tire 3. Hereinafter, a peak value at the end time of contacting the ground where the output voltage of the vibration sensor unit 10 has the local minimum value is referred to as a second peak value.

The output voltage of the vibration sensor unit 10 takes the peak values at the above-described timings for the following reasons. When the portion of the tread 31 corresponding to the position of the vibration sensor unit 10 contacts the ground with the rotation of the tire 3, a portion of the tire 3, which had a substantially cylindrical surface, is pressed to be deformed into a flat shape in the vicinity of the vibration sensor unit 10. With reception of an impact at this time, the output voltage of the vibration sensor unit 10 takes the first peak value. When the portion of the tread 31 corresponding to the position of the vibration sensor unit 10 is separated from the ground with the rotation of the tire 3, the pressing of the portion of the tire 3 is released in the vicinity of the vibration sensor unit 10, and the flat shape of the portion of the tire 3 returns to the substantially cylindrical shape. With reception of an impact at the time of restoring the original shape of the tire 3, the output voltage of the vibration sensor unit 10 takes the second peak value. As described above, the output voltage of the vibration sensor unit 10 takes the first peak value and the second peak value at the ground contact start time and the ground contact end time, respectively. Since a direction of the impact at the time when the tire 3 is pressed and a direction of the impact at the time when the tire 3 is released from pressurization are opposite, polarities of the output voltages are also opposite.

Here, the moment at which the portion of the tire tread 31 corresponding to the location of the vibration sensor unit 10 touches the road surface is referred to as a step-in region, and the moment at which the tire leaves the road surface is referred to as a kick-out region. The step-in region includes the timing of the first peak value, and the kick-out region includes the timing of the second peak value. In addition, a region before the step-in region is referred to as a pre-step-in region, and the region from the step-in region to the kick-out region, that is, the region of the tire tread 31 corresponding to the position where the vibration sensor unit 10 is attached is referred to as a pre-kick-out region. The region after the kick-out region is referred to as a post-kick-out region. In this manner, the period in which the portion of the tire tread 31 corresponding to the location of the vibration sensor unit 10 is in contact with the ground and before and after that portion can be divided into five regions. In FIG. 4, the pre-step-in region, the step-in region, the pre-kick-out region, the kick-out region and the post-kick-out region of the detection signal are indicated as five regions R1 to R5 in sequence.

The vibration generated in the tire 3 varies in each of the divided regions according to the road surface condition, and the detection signal of the vibration sensor unit 10 changes. Therefore, by analyzing the frequency of the detection signal of the vibration sensor unit 10 in each region, the road surface condition of the vehicle on the road surface is determined. For example, in a slippy road surface such as a snow-pressed road, the shearing force at the time of kicking out decreases, so that a frequency band value selected from 1 kHz to 4 kHz band in the kick-out region R4 and the post-kick-out region R5 decreases. Since each frequency component of the detection signal of the vibration sensor unit 10 changes according to the road surface condition, it is possible to determine the road surface condition based on the frequency analysis of the detection signal.

Figure 5:
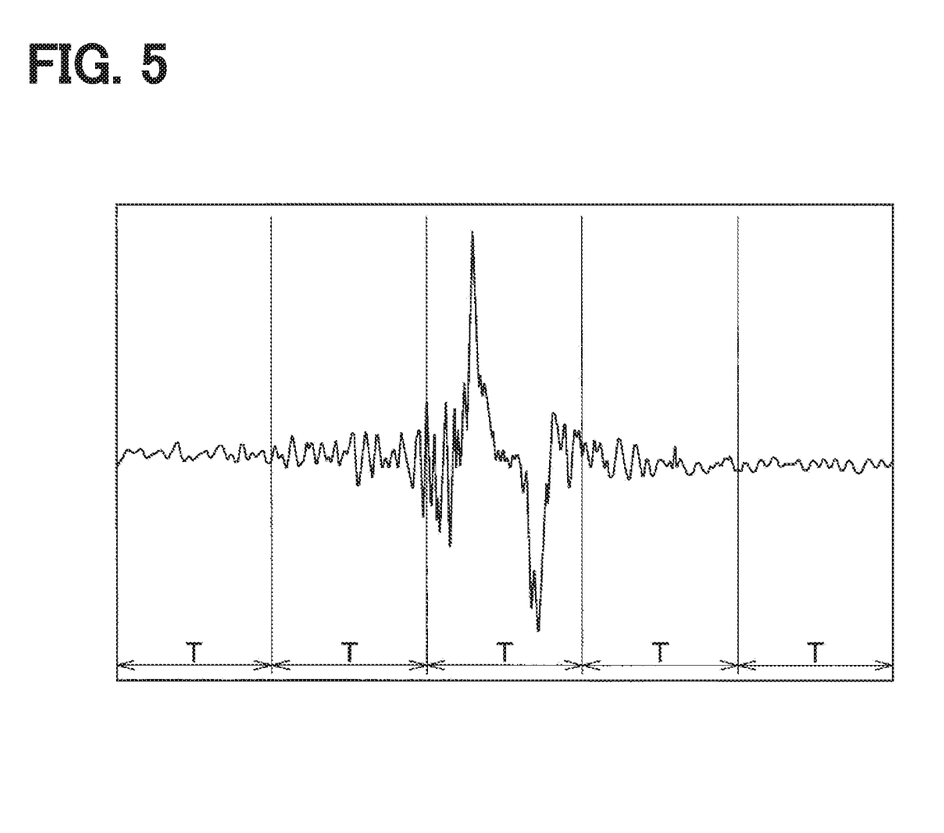
FIG. 5 is a waveform chart illustrating a detection signal from the acceleration signal acquisition unit which is segmented by each of time windows having a predetermined time width T.

The waveform processing unit 11 divides the detection signal of the vibration sensor unit 10 for one rotation of the tire 3 having a continuous time axis waveform into a plurality of sections each having a predetermined time width T as shown in FIG. 5, performs the frequency analysis in each section, and extracts the characteristic value. Specifically, by performing the frequency analysis in each section, the waveform processing unit 11 calculates a power spectrum value in each frequency band, that is, a vibration level in a specific frequency band, as the characteristic value.

The number of sections divided by the time window of the time width T is a value that varies according to the vehicle speed, more specifically, according to the rotation speed of the tire 3. In the following description, the number of sections for one rotation of the tire is indicated by "n" which is a natural number.

For example, the characteristic value is calculated as a power spectrum value, which is acquired by passing the detection signal of each section through a plurality of filters of specific frequency bands, for example, five band-pass filters of 0 to 1 kHz, 1 to 2 kHz, 2 to 3 kHz, 3 to 4 kHz and 4 to 5 kHz, and the like. The spectrum value is used as the characteristic value. This characteristic value is a characteristic vector Xi of a section "I" (natural number 1≤i≤n), which is expressed as a matrix of elements defined by the following equation. In this matrix, each element is represented as the power spectrum value $a_{ik}$ in each specified frequency band.

$$X_i = \begin{bmatrix} a_{i1} \\ a_{i2} \\ a_{i3} \\ a_{i4} \\ a_{i5} \end{bmatrix} \quad \text{[Equation 1]}$$

In this equation, "k" of the power spectrum value $a_{ik}$ is the number of the specific frequency bands, that is, the number of the band-pass filters. In case that the frequency band of 0 to 5 kHz is divided into five sections as exemplified above, k is 1 to 5 (k=1 to 5). The determinant X that comprehensively represents the characteristic vectors X1 to Xn of all the sections 1 to n is as follows.

$$X = \begin{pmatrix} a_{11} & a_{21} & \cdots & a_{n1} \\ a_{12} & a_{22} & \cdots & a_{n2} \\ a_{13} & a_{23} & \cdots & a_{n3} \\ a_{14} & a_{24} & \cdots & a_{n4} \\ a_{15} & a_{25} & \cdots & a_{n5} \end{pmatrix} \quad \text{[Equation 2]}$$

This determinant X is an expression representing the characteristic value of one rotation of the tire. The waveform processing unit 11 extracts the characteristic value represented by the above determinant X by frequency-analyzing the detection signal of the vibration sensor unit 10.

Operations of the tire device 100 and the tool 200 will be described next with reference to FIG. 6 and FIG. 7.

The road surface condition determination by the tire device 100 will be described first.

Figure 6:
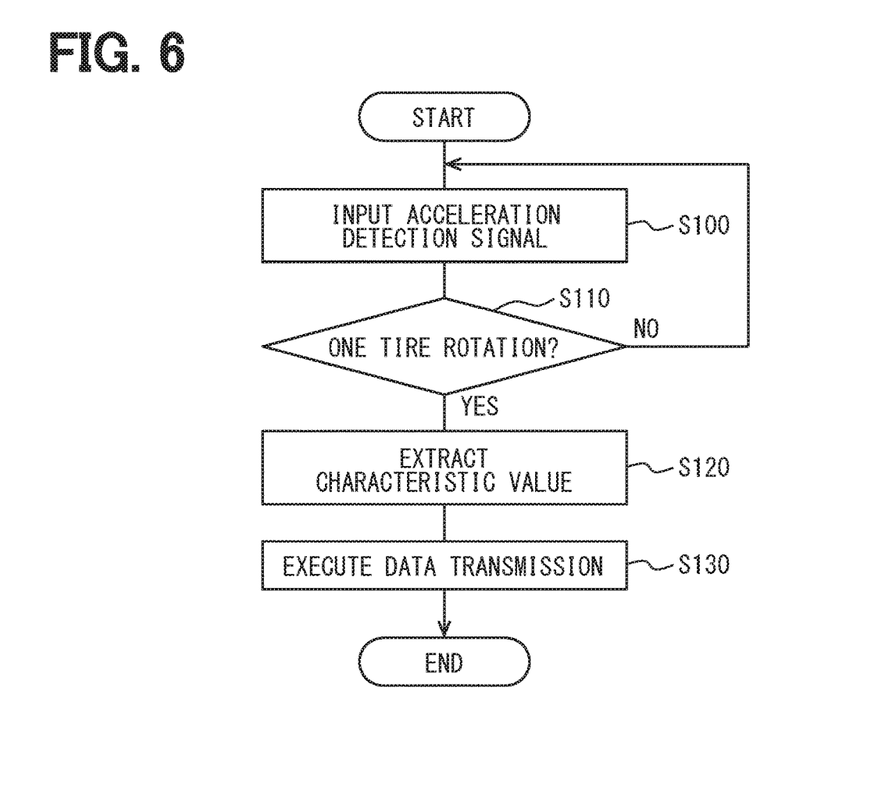
FIG. 6 is a flowchart of a data transmission process performed by a control unit of the tire side device.

In the tire side device 1 of each wheel, the waveform processing unit 11 executes data transmission processing shown in FIG. 6 when the sensing function and the data transmission function has been activated. This processing is executed at every predetermined control cycle.

In step S100, the detection signal of the vibration sensor unit 10 is inputted. This processing is continued until it is determined in the following step S110 that the tire 3 has made one rotation. When the rotation signal of one rotation of the tire 3 has been inputted from the vibration sensor unit 10, step S120 is executed. In step S120, the characteristic value of the time-axis waveform of the detection signal inputted from the vibration sensor unit 10 is extracted.

It is noted that one rotation of the tire 3 is checked based on the time-axis waveform of the detection signal of the vibration sensor unit 10. Since the detection signal has the time-axis waveform shown in FIG. 4, it is possible to determine one rotation of the tire 3 by confirming the first peak value and the second peak value of the detection signal.

The road surface condition appears remarkably as a change in the time-axis waveform of the detection signal in a period including the step-in region, the pre-kick-out region and the kick-out region as well as a little before and after that period. As far as the data during this period has been inputted, it is not always necessary to input all the data of the detection signal of the vibration sensor unit 10 during one rotation of the tire 3. For example, regarding the detection signals of the pre-step-in region and the post-kick-out region, it will be sufficient to acquire the data near the step-in region and the kick-out region. For this reason, a region where a vibration level in the detection signal of the vibration sensor unit 10 is smaller than a predetermined threshold value may be treated as a region, which is less affected by the road surface condition. The detection signal in such less-affected region in the pre-step-in region and the post-kick-out region need not be inputted.

The characteristic value is extracted in step S120 in the above-described manner.

In step S130, the road surface data including the characteristic value extracted in the present control cycle is transmitted to the data transmission unit 12 for data transmission. Thus, the road surface data including the characteristic value is transmitted from the data communication unit 12.

Figure 7:
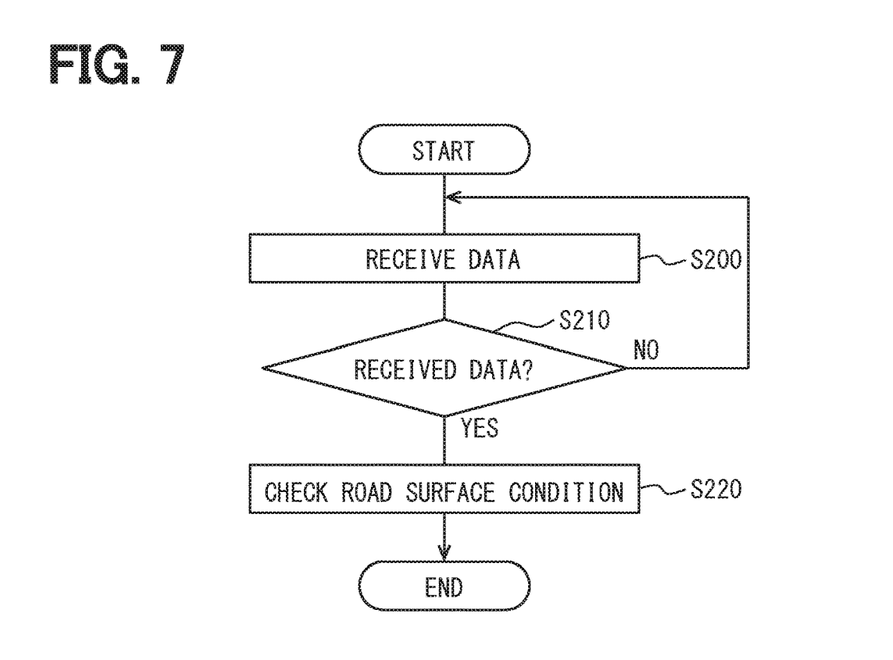
FIG. 7 is a flowchart of a road surface condition determination process performed by the body side system.

The receiver 21 executes road surface condition determination processing shown in FIG. 7 by the road surface check unit 25. This processing is executed at every predetermined control cycle.

In step S200, data reception processing is executed. This processing is executed by acquiring the road surface data by the road surface check unit 25 upon reception of the road surface data by the data communication unit 24. When the data communication unit 24 does not perform the data receiving operation, the road surface check unit 25 finishes the present processing without acquiring the road surface data.

Then, in step S210, it is checked whether the data communication unit 24 has received data. When the data has been received, step S220 is executed. When the data has not been received, processing of steps S200 and S210 is repeated until the data reception is made.

In step S220, the road surface condition is checked and determined. In checking the road surface condition, the characteristic value included in the received road surface data is compared with the predetermined support vectors of various types of road surfaces stored in the road surface check unit 25. For example, a similarity of the characteristic value to each of the predetermined support vectors of the road surfaces is calculated, and the road surface on which the vehicle is presently traveling is determined to be a road surface corresponding to the support vector having the highest similarity.

For example, the similarity of each characteristic value relative to all support vectors of the various types of road surfaces may be calculated in the following manner.

As described above, regarding the determinant X representing the characteristic value, the determinant of the characteristic value is indicated as X(r), the determinant of the support vector is indicated as X(s), and power spectrum values $a_{ik}$ which are elements of these determinants are indicated as $a(r)_{ik}$ and $a(s)_{ik}$, respectively. In this case, the determinant X(r) of the characteristic value and the determinant X(s) of the support vector are expressed as follows.

$$x(r) = \begin{pmatrix} a(r)_{11} & a(r)_{21} & \ldots & a(r)_{n1} \\ a(r)_{12} & a(r)_{22} & \ldots & a(r)_{n2} \\ a(r)_{13} & a(r)_{23} & \ldots & a(r)_{n3} \\ a(r)_{14} & a(r)_{24} & \ldots & a(r)_{n4} \\ a(r)_{15} & a(r)_{25} & \ldots & a(r)_{n5} \end{pmatrix} \quad \text{[Equation 3]}$$

$$x(s) = \begin{pmatrix} a(s)_{11} & a(s)_{21} & \ldots & a(s)_{n1} \\ a(s)_{12} & a(s)_{22} & \ldots & a(s)_{n2} \\ a(s)_{13} & a(s)_{23} & \ldots & a(s)_{n3} \\ a(s)_{14} & a(s)_{24} & \ldots & a(s)_{n4} \\ a(s)_{15} & a(s)_{25} & \ldots & a(s)_{n5} \end{pmatrix} \quad \text{[Equation 4]}$$

The similarity indicates a degree of similarity between the characteristic value and the support vector, which are expressed by two determinants. As the similarity is higher, the characteristic value and the support vector are considered to be more similar. In the present embodiment, the road surface check unit 25 calculates the similarity by using Kernel method and checks changes in the road surface condition based on the calculated similarity. Here, the similarity is determined by using a scalar product (inner product) of the determinant X(r) of the characteristic value and the determinant X(s) of the support vector. The scalar product is calculated as a distance between coordinates indicated by the characteristic vector Xi between sections, which are determined by dividing a characteristic space by the time window of the predetermined time width T.

Figure 8:
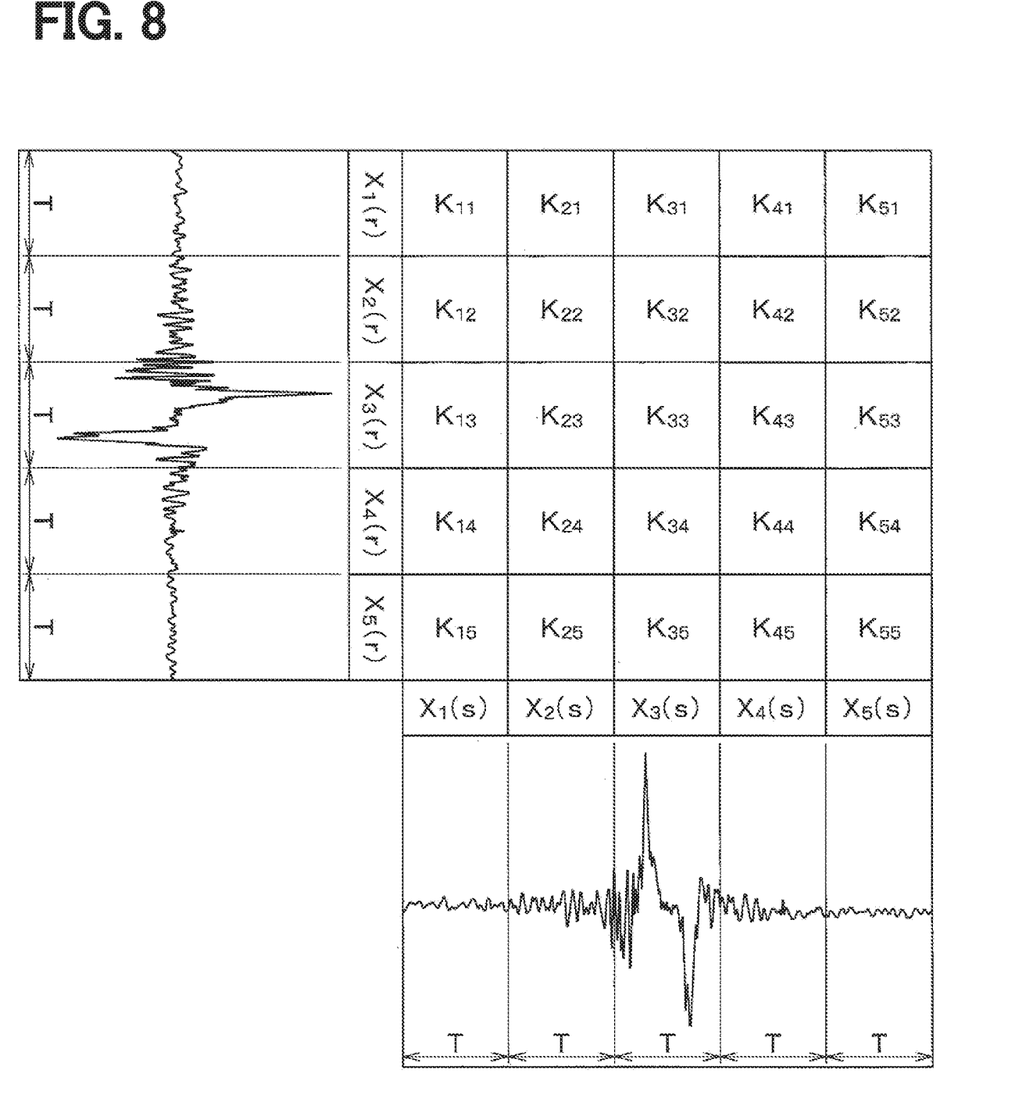
FIG. 8 is a graph illustrating respective relationships between determinants $Xi(r)$ and $Xi(s)$ and a distance yz in each of segments determined by dividing, by each of the time windows having the predetermined time width T, a time axis waveform during a present tire rotation and a time axis waveform during an immediately previous tire rotation.

For example, as shown in FIG. 8, the time-axis waveform of the detection signal of the vibration sensor unit 10, specifically, the time-axis waveform of the present rotation of the tire 3 and the time-axis waveform of the support vector, is divided into sections by the time window of the predetermined time width T. In the illustrated example, each time-axis waveform is divided into five sections, and hence n is 5 (n=5) and i is variable from 1 to 5 (1≤i≤5). As illustrated in the figure, the characteristic vector Xi of each section of the present rotation of the tire 3 is indicated as Xi(r) and the characteristic vector of each section of the support vector is indicated as Xi(s). In this case, the distance $K_{yz}$ between the coordinates indicated by the characteristic vector Xi of each section is indicated like a square section, at which horizontal square sections including the characteristic vectors Xi(r) of each section of the present rotation of the tire 3 cross vertical square sections including the characteristic vectors Xi(s) of each section of the support vector. It is noted that, in the distance $K_{yz}$, y is a replacement of i of Xi(s) and z is a replacement of i of Xi(r). In actuality, the numbers of sections of the present rotation of the tire 3 and the support vector are different from each other. In this example, however, the numbers of sections are assumed to be equal.

In the present embodiment, the characteristic vector is acquired for five specific frequency bands. As a result, the characteristic vector Xi of each section is represented in the six-dimension space together with the time-axis. The distance between the coordinates indicated by the characteristic vectors Xi between the sections becomes equal to the distance between the coordinates in the six-dimension space. The distance between the coordinates indicated by the characteristic vector of each section becomes smaller and larger, as the characteristic value and the support vector become more similar and less similar, respectively. Thus, the similarity becomes larger and smaller, as the distance becomes smaller and larger, respectively.

For example, in case that the sections 1 to n are defined by time division, the distance $K_{yz}$ between the coordinates indicated by the characteristic vectors of the sections 1 is expressed by the following equation.

$$Kyz = \sqrt{\{a(r)_{11} - a(s)_{11}\}^2 + \{a(r)_{12} - a(s)_{12}\}^2 + \ldots \{a(r)_{15} - a(s)_{15}\}^2} \quad \text{[Equation 5]}$$

The distance $K_{yz}$ between the coordinates indicated by the characteristic vector between the time-divided sections is calculated for all sections as described above, a total $K_{total}$ of the distances $K_{yz}$ of all sections is calculated, and the total $K_{total}$ is used as a value, which corresponds to the similarity. The total $K_{total}$ is compared with a predetermined threshold value Th. If the total $K_{total}$ is larger and smaller than the threshold value Th, the similarity is determined to be small and large, respectively. The similarity is calculated for all support vectors. Then the road surface type corresponding to the support vector which has the largest similarity is determined to be the road surface condition of the presently traveling road. It is thus possible to determine the road surface condition.

Although the total $K_{total}$ of the distances $K_{yz}$ between two coordinates indicated by the characteristic vector of each section is used as the value which corresponds to the similarity, other parameters indicating similarities may be used. For example, as a parameter which indicates a similarity, an average distance $K_{ave}$ which is an average value of the distances $K_{yz}$ calculated by dividing the total $K_{total}$ by the number of sections. Further, as conventionally proposed, the similarity may be calculated by using various Kernel functions, or by eliminating paths of low similarity.

Next, as the operation of the tire device 100 and the tool 200, the activation and sleep control of each tire side device 1 by the tool 200 will be described.

When the user takes the vehicle, on which the tire device 100 is mounted, to a vehicle repair shop for inspection such as vehicle inspection, the activation and sleep control of each tire side device 1 are performed using the tool 200. Since the inspection of the vehicle is performed at intervals of several months to one year or two years, the activation or sleep control of the tire side device 1 is performed at each interval.

As described above, in the tire side device 1 of each tire 3, the data transmission processing for determining the road surface condition is performed when the sensing function and the data transmission function are activated. However, the road surface data from all the tire side devices 1 is not required to perform the road surface condition determination. That is, the road surface condition can be determined using at least one road surface data of the plurality of tire side devices 1. Therefore, the tool 200 transmits the activation instruction signal for at least one of the plurality of tire side devices 1 and transmits the sleep instruction signal for one or more remaining tire side devices 1.

The instruction signal includes the ID information, and the tire side device 1 can identify whether the instruction signal is directed to itself. Therefore, the instruction reception unit 14 of each tire side device 1 is transmitted to the activation control unit 15. Thereby, the activation control unit 15 activates the sensing function and the data transmission function when the signal instructing the activation is transmitted, and puts the sensing function and the data transmission function to sleep when the signal instructing sleep is transmitted.

In this way, at least one of the plurality of tire side devices 1 is set to the active state, and the remaining one or more is set to the sleep state. This makes it possible to reduce the power consumption of the tire side devices 1 which are put in the sleep state. Therefore, it is possible to extend the battery life.

The number of tire side devices 1 to be activated at this time is arbitrary, but is preferably one or two. In case only one tire side device 1 is activated, the remaining three tire side devices 1 can be put into the sleep state so that the power consumption can be reduced most. In case two tire side devices 1 are activated, the remaining two tire side devices 1 can be put into the sleep state, so that not only power consumption can be reduced but also the road surface condition can be determined more accurately based on two road surface data. In particular, in case the two tire side devices 1 to be activated are provided for the left wheel and the right wheel, the road surface condition of each of the left and right wheels can be determined. For this reason, in case the two tire side devices 1 are to be activated, it is preferable that such two tire side devices 1 are provided in any one of a pair of left and right front wheels and a pair of left and right rear wheels or any one of two pairs of the left and right wheels positioned diagonally.

Furthermore, it is preferable that the tire side device 1 to be activated or the tire side device 1 to be in the sleep state be sequentially switched so that the power consumption of each tire side device 1 is reduced equally as much as possible. In case only one tire side device 1 is to be activated, it is preferable that each tire side device 1 be activated sequentially in the order of, for example, the right front wheel, the left front wheel, the right rear wheel and the left rear wheel. Similarly, in case the two tire side devices 1 are to be activated, for example, the left and right front wheel tire side devices 1 and the left and right rear wheel tire side devices 1 are preferably activated alternately.

It is noted that whether the respective tire side devices 1 are in the active state or in the sleep state can be stored in some storage medium. It is possible to recognize whether to set each tire side device 1 to the active state or the sleep state based on the content stored in the storage medium. When the vehicle travels, the road surface data is transmitted from the tire side device 1 which is in the active state. Therefore, it is possible to recognize the tire side device 1 in the activatione state by driving the vehicle at a low speed and checking the ID information included in the transmitted road surface data. It is thus possible to determine whether to set each tire side device 1 to the active state or the sleep state.

As described above, the tire device 100 according to the present embodiment can determine the road surface condition of the traveling road surface of the vehicle. When determining the road surface condition, the sensing function and the data transmission function are not kept in the active state continuously for all the tire side devices 1 but at least one is activated and the remaining one or more is kept in the sleep state. This makes it possible to reduce the power consumption of the tire side device 1 which are put in the sleep state. In case the road surface data including the characteristic value is transmitted from the tire side device 1 as described above, a large amount of data need be transmitted and the power consumption is increased. Therefore, the power consumption reduction effect is increased by activating only some of the tire side devices 1. Further, the signal waveform itself of the detection signal of the vibration sensor unit 10 can be sent as road surface data from the tire side device 1 to extract the characteristic value in the body side system 2. In this case, the data amount is further increased. Therefore, reduction of power consumption is particularly effective.

In addition, since the sensing function and the data transmission function of at least one tire side device 1 are kept activated, the road surface condition can be accurately determined based on the road surface data of the tire side device 1.

Therefore, it is possible to provide the tire device 100 including the road surface condition determining device capable of accurately determining the road surface condition while reducing power consumption.

Second Embodiment

A second embodiment will be described next. This embodiment is different from the first embodiment in that the control of the activation and sleep is performed not by the tool 200 but by the body side system 2, here, the receiver 21. Therefore, only the portions different from the first embodiment will be described.

Figure 9:
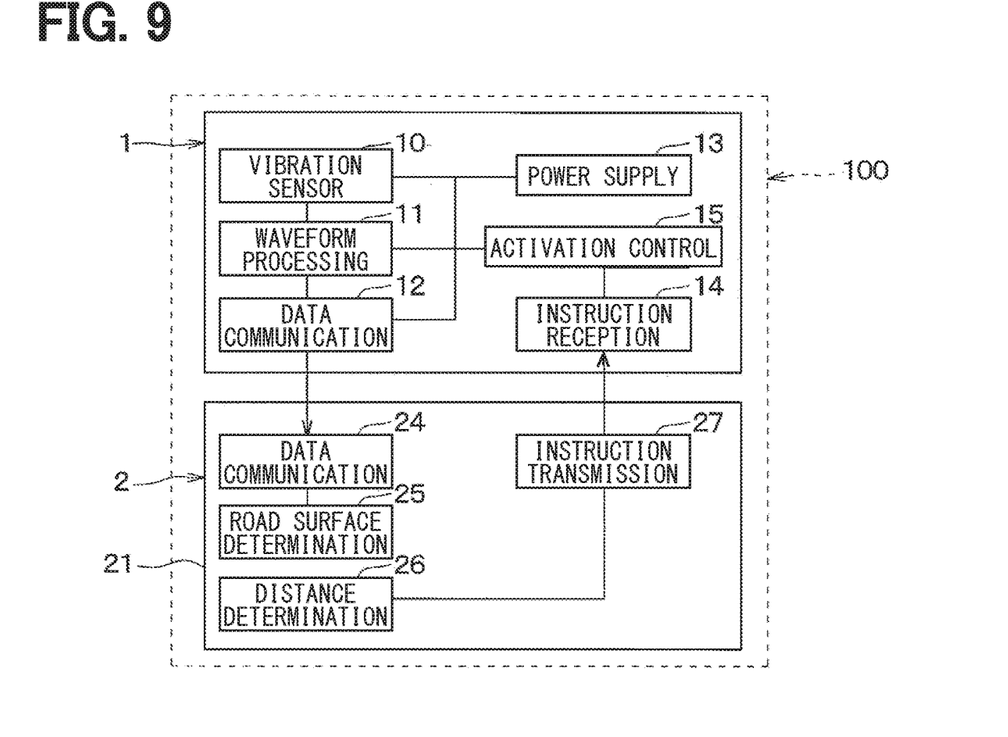
FIG. 9 is a block diagram illustrating details of a tire side device and a body side system which are provided in a tire device according to a second embodiment.

As shown in FIG. 9, in the present embodiment, a distance determination unit 26 and an instruction transmission unit 27 are provided in addition to the data communication unit 24 and the road surface condition determination unit 25.

The distance determination unit 26 is provided as a timing determination unit, and configured to determine a switching timing between the active state and the sleep state based on a traveling distance of the vehicle. When the vehicle travels a distance at which switching between the active state and the sleep state is to be performed, the distance determination unit 26 outputs a signal to that effect to the instruction transmission unit 27. Specifically, every time the traveling distance reaches a predetermined distance, for example, 10,000 km, the distance determination unit 26 outputs the signal for switching between the active state and the sleep state. The travel distance of the vehicle is calculated by, for example, a meter ECU (not shown). For this reason, the distance determination unit 26 is configured to acquire the travel distance by acquiring data from the meter ECU, and check whether the travel distance reached the predetermined distance.

The instruction transmission unit 27 is provided to perform a similar function of the instruction transmission unit 201 described in the first embodiment. In the present embodiment, the instruction transmission unit 27 is configured to transmit an instruction signal to each tire side device 1 based on a signal transmitted from the distance determination unit 26. When the instruction signal is received by the instruction reception unit 14 of each tire side device 1, each tire side device 1 enters into the active state or the sleep state according to the instruction indicated by the instruction signal. It is noted that the tire side device 1 may be put in the active state and the sleep state in the same manner as in the first embodiment. The content of the instruction is set to enable such a state switching operation.

As described above, the body side system 2 is provided with the distance determination unit 26 that determines the switching timing of the active state and the sleep state of the tire side device 1 and the instruction transmission unit 201 that instructs the switching. As described above, even in case the body side system 2 is provided with the function of switching between the active state and the sleep state of the tire side device 1, the same effect as in the first embodiment can be attained.

In the present embodiment, the distance determination unit 26 that determines the switching timing based on the traveling distance of the vehicle is provided as an example of the timing determination unit. However, the switching timing is not limited to the traveling distance of the vehicle, but may be determined based on other parameters, for example, elapsed time from the previous switching time. For example, a clock may be provided in the body side system 2, and the clock may be used to measure the elapsed time from the previous switching time. Further, in case road-to-vehicle communication is performed by a navigation system (not shown) or the like, the present time may be acquired from a roadside device, and the elapsed time from the time of the previous switching to the present time may be measured.

Third Embodiment

A third embodiment will be described next. In the present embodiment, the tire side device 1 is configured to control the activation and sleep by itself as opposed to the first and second embodiments. Only different parts will be described.

Figure 10:
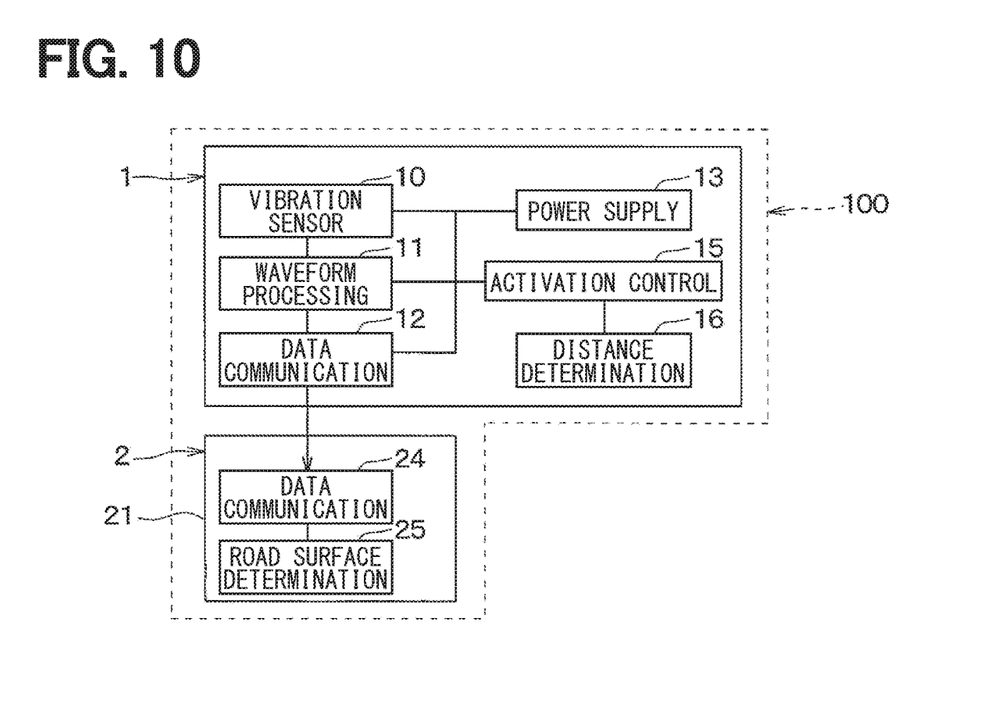
FIG. 10 is a block diagram illustrating details of a tire side device and a body side system which are provided in a tire device according to a third embodiment.

As shown in FIG. 10, in the present embodiment, the tire side device 1 includes a distance determination unit 16, and hence no instruction reception unit is provided.

The distance determination unit 16 is provided as the timing determination unit, and configured to determine the switching timing between the active state and the sleep state based on the traveling distance of the vehicle. When the traveling distance reaches a predetermined value at which the switching between the active state and the sleep state is to be performed, the distance determination unit 16 outputs a signal to that effect to the activation control unit 15. However, the sleep state in the present embodiment means a sleep of the data transmission function, and the sensing function remains activated without sleeping.

Specifically, every time the traveling distance reaches the predetermined distance, for example, 10,000 km, the distance determination unit 16 outputs a signal indicating that it is time to perform the state switching between the active state and the sleep state. As for the traveling distance of the vehicle, the number of rotations of the tire 3 can be calculated based on the vibration waveform indicated by the detection signal of the vibration sensor unit 10. Therefore, the traveling distance is calculated by multiplying the number of rotations of the tire 3 by the circumference of the tire 3. As for the tire side device 1 that is in the sleep state, the sensing function remains activated and hence the traveling distance of the vehicle can be calculated.

As described above, the tire side device 1 includes the distance determination unit 16, and outputs the signal indicating the switching timing to the activation control unit 15 when the traveling distance at which the active state and the sleep state are to be switched is reached. Based on this signal, the activation control unit 15 of each tire side device 1 determines whether to activate or sleep, and activates the data communication unit 12 or puts the data communication unit 12 to sleep based on the determination result.

It is noted that the tire side device 1 may be put in the active state or the sleep state in the same way as in the first embodiment. Based on this way, the activation control unit 15 switches the state of the data communication unit 12. For example, in case two of the four tire side devices 1 are to be activated and the remaining two are to be in the sleep state, the activation control unit 15 reverses the operation state of each tire side device 1 from the state before the signal of switching instruction is input. When only one of the four tire side devices 1 is to be activated and the remaining three are to be in the sleep state, the predetermined distance used for determining the switching timing may be set so that the four tire side devices 1 are sequentially activated one by one. Further, it is likely to occur that the measured travel distance varies in the tire side device 1 of each tire 3. For this reason, a timing may be provided in which a plurality or all of the tire side devices 1 are activated in an overlapping manner in order to have a certain margin.

As described above, in the present embodiment, the tire side device 1 includes the distance determination unit 16 that determines the timing of switching between the active state and the sleep state. Even in such a configuration, the sensing function of the tire side device 1 is not put to sleep, but the data communication function is put to sleep. As a result, power consumption can be reduced in the similar way as in the first embodiment.

In the present embodiment, the distance determination unit 16 that determines the switching timing based on the traveling distance of the vehicle is provided as an example of the timing determination unit. However, the switching timing is not limited to the traveling distance of the vehicle, but may be determined based on other parameters, for example, elapsed time from the previous switching time. For example, a clock may be provided in the tire side device 1 and the clock may be used to measure the elapsed time from the previous switching time. Further, it is possible to determine the switching timing when the number of rotations of the tire 3 reaches a predetermined number of rotations. Further, since the amplitude of the vibration waveform indicated by the detection signal of the vibration sensor unit 10 changes depending on the wear state of the tire 3, the switching timing may be determined based on the wear state of the tire 3 which is detected based on the magnitude of the amplitude.

Although the data communication function is set to the sleep state in the present embodiment, the sampling by the vibration sensor unit 10 may be reduced in comparison with that in the active state. For example, sampling by the vibration sensor unit 10 can be reduced by reducing the clock or lengthening the sampling period. This makes it possible to reduce power consumption for the sensing function as well.

Fourth Embodiment

A fourth embodiment will be described. The present embodiment is different from the first embodiment in that the tire side device 1 is provided with a tire air pressure detection function. Other components are the same as those of the first embodiment.

Figure 11:
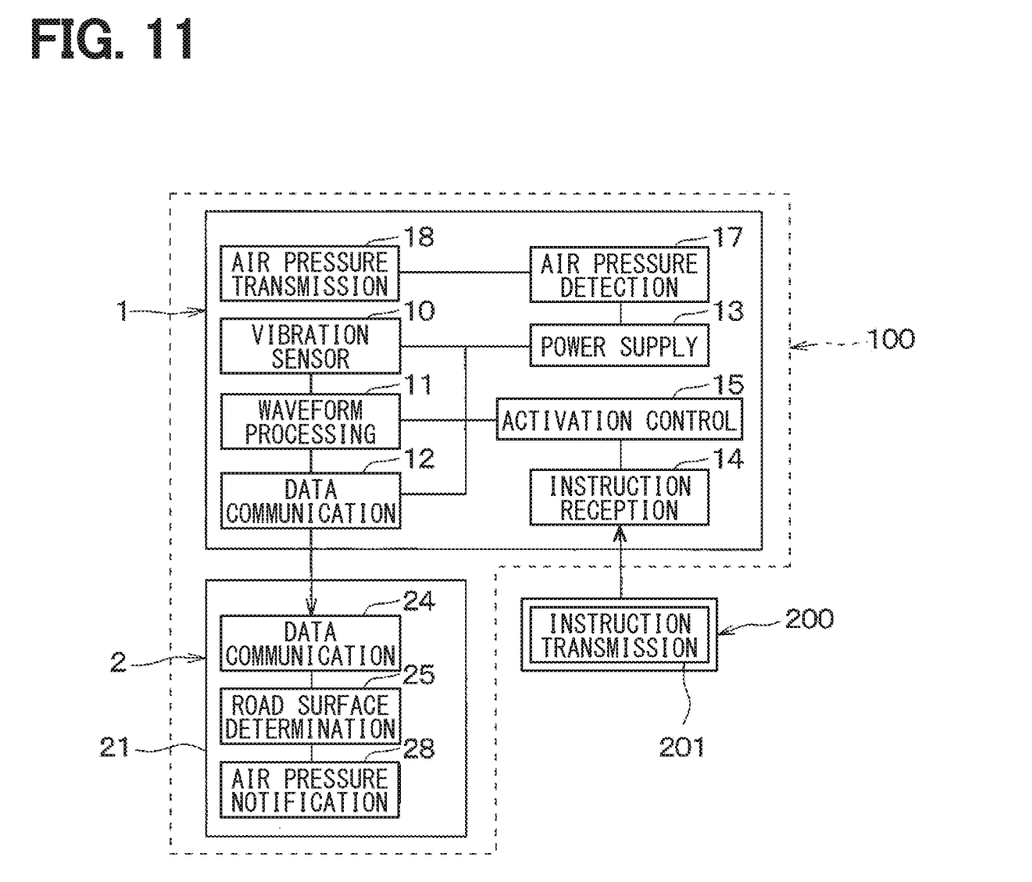
FIG. 11 is a block diagram illustrating details of a tire side device, a body side system and a tool which are provided in a tire device according to a fourth embodiment.

As shown in FIG. 11, the tire side device 1 according to the present embodiment includes an air pressure detection unit 17 and an air pressure transmission unit 18 in addition to the vibration sensor unit 10, the waveform processing unit 11, the data communication unit 12, the power supply unit 13, the instruction reception unit 14 and the activation control unit 15.

The air pressure detection unit 17 such as a pressure sensor or a temperature sensor is provided to detect a physical quantity related to a tire air pressure. For example, the air pressure detection unit 17 is configured to perform sensing with a pressure sensor or a temperature sensor every predetermined sampling cycle. The air pressure detection unit 17 generates data relating to a tire air pressure (hereinafter referred to as tire air pressure data) such as an air pressure and a tire inside temperature based on a detection signal of each sensor, and transmits the data to the air pressure transmission unit 18.

For example, when the air pressure data is transmitted from the air pressure detection unit 17, the air pressure transmission unit 18 transmits the air pressure data at a predetermined timing. The timing of data transmission from the air pressure transmission unit 18 is arbitrary, but is performed based on a predetermined periodic transmission cycle.

On the other hand, the body side system 2 includes an air pressure notification unit 28 in addition to the data communication unit 24 and the road surface condition determination unit 25. The data communication unit 24 receives the air pressure data, and the air pressure notification unit 28 notifies the user of the air pressure of each tire 3 or notifies that the air pressure has decreased. The air pressure notification unit 28 is configured by, for example, a meter display installed in an instrument panel of the vehicle, and the notification device 23 may configure the air pressure notification unit 28.

In the tire device 1 having the road surface condition determination function and the air pressure detection function configured as described above, not only the road surface data but also the air pressure data are transmitted to the body side system 2. Here, the road surface condition can be generally correctly detected by detecting based on the road surface data from any one of the tire side devices 1 of the plurality of tires 3. However, since the air pressure need be detected for all of the plurality of tires 3, it is necessary to transmit the air pressure data of each tire device 1 to the vehicle body system 2.

Therefore, the activation control unit 15 is configured to perform the activation and sleep control for the function of sensing vibration applied to the tire 3 and the function of transmitting the road surface data in the switching manner, and activate the function of sensing the air pressure and the function of transmitting the air pressure data continuously without switching.

As described above, the tire side device 1 is configured to have not only the function for determining the road surface condition but also the function for detecting the air pressure of the tire 3. In this case, when the tire side device 1 is set to the sleep state, the function for determining the road surface condition is set to the sleep state, and the function for detecting the air pressure is kept in the active state.

Thereby, while detecting the air pressure for all the tires 3, the function for determining the road surface condition of at least one of the plurality of tire side devices 1 is set to the active state, and the remaining one or more is set to the sleep state. According to the present embodiment, the tire device 100 can have the road surface condition determining device capable of not only accurately determining the road surface condition while reducing power consumption but also detecting the air pressure of all the tires 3.

Other Embodiment

Although the present disclosure is made based on the embodiments described above, the present disclosure is not limited to such embodiments but includes various changes and modifications which are within equivalent ranges. In addition, other combinations and configurations including further only a single element, more or less, are also within the spirit and scope of the present disclosure.

(1) For example, in the above embodiments, the vibration sensor unit 10 is formed of the acceleration sensor. However, the vibration sensor unit 10 may be formed of other elements such as a piezoelectric element capable of detecting vibration.

(2) Further, in the above embodiments, data including the characteristic value is used as the road surface data indicating the road surface condition appearing in the detection signal of the vibration sensor unit 10 from the tire side device 1. However, this is only one example, and other data may be used as the road surface data. For example, the integrated value data of the vibration waveform of each of the five regions R1 to R5 included in the vibration data of one rotation of the tire 3 may be used as the road surface data, or raw data of the detection signal itself may be used as the road surface data.

(3) Still further, in the above embodiments, the road surface condition determination unit 25 of the receiver 21 provided in the body side system 2 is configured to determine the road surface condition by calculating the degree of similarity between the characteristic value and the support vector. In the second embodiment, the receiver 21 includes the distance determination unit 26 and the instruction transmission unit 27, and transmits the instruction signal to the tire side device 1.

However, this is only one example. It is also possible that any sections in the body side system 2, e.g., other ECU such as the brake ECU 23 may be configured to determine the degree of similarity, determine the road surface condition and transmit the instruction signal. In addition, it is also possible to store the support vector in the tire side device 1 so that the tire side device 1 determines the road surface condition and transmit data indicating the determination result of the road surface condition to the body side system 2 as the road surface data.

(4) In the fourth embodiment, the air pressure detection unit 17 is configured by the pressure sensor, the temperature sensor or the like. However, the air pressure detection unit 17 may be configured by the vibration sensor unit 10 and the waveform processing unit 11.

Specifically, since the length of the ground contact surface of the tire 3 changes according to the air pressure, the air pressure can be detected based on the change in the length of the ground contact surface. For example, the elapsed time from the first peak value to the second peak value in the output voltage of the vibration sensor unit 10 changes according to the length of the ground contact surface. In addition, the time required for the tire 3 to make one rotation is determined from the time interval of the successive first peak values and the time interval of the successive second peak values. The vehicle speed can be determined from the time period and the traveling distance of one rotation of the tire 3. Therefore, the length of the ground contact surface can be determined from the vehicle speed and the elapsed time from the first peak value to the second peak value, and the air pressure can be determined from the length of the ground contact surface of the tire 3.

In this case, activating the air pressure detection function is equivalent to activating the vibration sensor unit 10 and the waveform processing unit 11. However, since it is not necessary to transmit the road surface data, the transmission function of the road surface data may be put to sleep thereby reducing the power consumption. In particular, the periodic transmission interval of the air pressure data is sufficiently longer than the transmission interval of the road surface data. Therefore, power consumption can be further reduced by activating the vibration sensor unit 10 and the waveform processing unit 11 only at the time of the periodic transmission time of the air pressure data.

(5) In the first, second, and fourth embodiments, both transmission and reception are performed by the tire side device 1. The communication in this case can be performed by a known short-range wireless communication technique such as Bluetooth (registered trademark). However, since the instruction signal for instructing the activation and sleep need be transmitted from the vehicle body side system 2 or the tool 200 to the tire side device 1, it is sufficient that communication with a small amount of data can be performed. The communication method is not limited to a particular method.

What is claimed is:

1. A road surface condition determining device comprising:
a tire side device attached to each of a plurality of tires of a vehicle and including a vibration detection unit for outputting a detection signal corresponding to a magnitude of vibration of the tire, a waveform processing unit for generating road surface data indicating a road surface condition appearing in a waveform of the detection signal, and a data transmission unit for transmitting the road surface data; and
a road surface condition determination unit including a data reception unit for receiving the road surface data transmitted from the data transmission unit, and determining a road surface condition of a travel road surface of the vehicle based on the road surface data, wherein:
the tire side device further includes an instruction reception unit for receiving the instruction signal from an instruction transmission unit, which is provided outside the tire side device for transmitting the instruction signal for activation or sleep, and an activation control unit for controlling switching of the vibration detection unit, the waveform processing unit and the data transmission unit between an active state and a sleep state based on an instruction indicated by the instruction signal;
the vibration detection unit, the waveform processing unit and the data transmission unit of the tire side device of at least one of the plurality of tires are put in the active state, and at least the data transmission unit among the vibration detection unit, the waveform processing unit and the data transmission unit of the tire side device of at least another one of the plurality of tires is put in the sleep state;

the tire side device includes an air pressure detection unit for detecting an air pressure of the tire, to which the tire side device is attached, and generating air pressure data indicating the air pressure of the tire, and an air pressure transmission unit configured to transmit the air pressure data; and the tire side device is configured to put their air pressure detection unit and the air pressure transmission unit in the active state even when the at least the data transmission unit of the tire side device is put in the sleep state.

2. A tire system comprising:

the road surface condition determining device according to claim 1; and a tool including the instruction transmission unit.

3. The road surface condition determining device according to claim 1, wherein:

the instruction transmission unit is included in a body side system provided in a vehicle body.

4. The road surface condition determining device according to claim 3, wherein:

the body side system includes a timing determination unit for determining a switching timing for switching between the active state and the sleep state and outputting a signal indicating the switching timing; and the instruction transmission unit is configured to transmit the instruction signal in response to the signal indicating the switching timing from the timing determination unit.

5. The road surface condition determining device according to claim 4, wherein:

the timing determination unit is a distance determination unit configured to determine the switching timing for switching between the active state and the sleep state based on a travel distance of the vehicle.

6. A road surface condition determining device comprising:

a tire side device attached to each of a plurality of tires of a vehicle and including a vibration detection unit for outputting a detection signal corresponding to a magnitude of vibration of the tire, a waveform processing unit for generating road surface data indicating a road surface condition appearing in a waveform of the detection signal, and a data transmission unit for transmitting the road surface data; and a road surface condition determination unit including a data reception unit for receiving the road surface data transmitted from the data transmission unit, and determining a road surface condition of a travel road surface of the vehicle based on the road surface data, wherein:

the tire side device includes a timing determination unit configured to determine a switching timing for switching between an active state and a sleep state and output a signal indicating the switching timing, and an activation control unit configured to switch the vibration detection unit, the waveform processing unit and the data transmission unit between the active state and the sleep state;

the vibration detection unit, the waveform processing unit and the data transmission unit of the tire side device of at least one of the plurality of tires are put in the active state, and at least the data transmission unit among the vibration detection unit, the waveform processing unit and the data transmission unit of the tire side device of at least another one of the plurality of tires is put in the sleep state;

the tire side device includes an air pressure detection unit for detecting an air pressure of the tire, to which the tire side device is attached, and generating air pressure data indicating the air pressure of the tire, and an air pressure transmission unit configured to transmit the air pressure data; and the tire side device is configured to put the air pressure detection unit and the air pressure transmission unit in the active state even when the at least the data transmission unit of the tire side device is put in the sleep state.

7. A road surface condition determining device comprising:

a tire side device attached to each of a plurality of tires of a vehicle and including a power supply therein, wherein the tire side device is configured to perform processes of:

generating a detection signal indicating a magnitude of vibration of the tire;

waveform-processing a waveform of the detection signal to generate road surface data indicating a road surface condition appearing in the waveform of the detection signal;

transmitting the road surface data to a road surface condition determination unit, which is provided outside the tire to determine a road surface condition of a travel road surface of the vehicle based on the road surface data;

controlling switching of the processes of generating, waveform processing and transmitting between an active state and a sleep state, the process of controlling putting all the processes of generating, processing and transmitting of only a part of the plurality of tires to be in the active state, and the process of controlling putting at least the process of transmitting among the processes of generating, waveform-processing and transmitting of the tire side device of another part of the plurality of tires to be in the sleep state;

detecting an air pressure of the tire, to which the tire side device is attached, and generating air pressure data indicating the air pressure of the tire; and transmitting the air pressure data externally, the process of controlling putting the processes of detecting and transmitting the air pressure in the active state even when the at least the process of the transmitting the road surface data of the tire side device is put in the sleep state.

* * * * *